United States Patent [19]
Dijkmans

[11] Patent Number: 5,877,948
[45] Date of Patent: Mar. 2, 1999

[54] VOLTAGE CONVERTER

[75] Inventor: Eise C. Dijkmans, Eindhoven, Netherlands

[73] Assignee: U.S. Philips Corporation, New York, N.Y.

[21] Appl. No.: 880,377

[22] Filed: Jun. 23, 1997

[30] Foreign Application Priority Data

Jun. 26, 1996 [EP] European Pat. Off. .............. 96201776

[51] Int. Cl.$^6$ ................................ H02M 3/18; G05F 1/10
[52] U.S. Cl. ............................ 363/60; 363/59; 327/536; 307/110; 307/296
[58] Field of Search ........................ 363/60, 59; 307/110, 307/296, 296.2, 296.1, 296.8; 327/536, 537, 589

[56] References Cited

U.S. PATENT DOCUMENTS

| | | | |
|---|---|---|---|
| 4,106,086 | 8/1978 | Holbook et al. ........................... | 363/60 |
| 4,199,806 | 4/1980 | Patterson, III ............................ | 363/60 |
| 4,321,661 | 3/1982 | Sano ........................................ | 363/60 |
| 5,397,931 | 3/1995 | Bayer ....................................... | 363/59 |
| 5,502,415 | 3/1996 | Matsui et al. ........................... | 327/536 |
| 5,559,687 | 9/1996 | Nicollini et al. ......................... | 363/60 |

FOREIGN PATENT DOCUMENTS

0626750 A1  11/1994  European Pat. Off. .

*Primary Examiner*—Peter S. Wong
*Assistant Examiner*—Rajnikant B. Patel
*Attorney, Agent, or Firm*—Steven R. Biren

[57] ABSTRACT

A voltage converter provided with charge pumps in which conventional rectifier diodes are replaced by output transistors. The output transistors at the same time act as voltage stabilizers. This also renders the ripple value of the voltage at the output terminal low when no smoothing capacitor, or a smoothing capacitor with a comparatively low capacitance value, is coupled to the output terminal.

20 Claims, 3 Drawing Sheets

VOLTAGE CONVERTER

BACKGROUND OF THE INVENTION

1. Field of the Invention

The invention relates to a voltage converter comprising a first supply terminal, a second supply terminal, an output terminal; a first charge pump comprising a first capacitor with a first and a second electrode, first means for alternately coupling either the first electrode of the first capacitor to the first supply terminal and the second electrode of the first capacitor to the second supply terminal, or the second electrode of the first capacitor to the first supply terminal; a second charge pump comprising a second capacitor with a first electrode and a second electrode, second means for alternately coupling, in phase with the first means, either the first electrode of the second capacitor to the first supply terminal and the second electrode of the second capacitor to the second supply terminal, or the second electrode of the second capacitor to the first supply terminal; and a first unidirectional element coupled between the first electrode of the first capacitor and the output terminal.

2. Discussion of the Related Art

Such a voltage converter is known from European Patent 0,626,750 and serves for generating a DC voltage which is higher than the supply voltage of the voltage converter. The voltage converter may be used, for example, in integrated circuits in cases in which a portion of the integrated circuit requires a DC voltage of a higher value than the value of the supply voltage. The first means comprise a first transistor which is coupled between the first supply terminal and the first electrode of the first capacitor, and a first inverter whose output is coupled to the second electrode of the first capacitor and whose input is coupled to an output of a pulse generator. The second means comprise a second transistor which is coupled between the first supply terminal and the first electrode of the second capacitor, and a second inverter whose output is coupled to the second electrode of the second capacitor and whose input is coupled to the output of the pulse generator. The known voltage converter also comprises a third and a fourth charge pump with third and fourth means. The third and the fourth charge pump and the third and the fourth means are of identical construction as compared with the first and the second charge pump and the first and the second means, respectively. The third and the fourth means operate in counterphase to the first and the second means. During a second phase, the second charge pump supplies a DC voltage to a control electrode of a transistor of the fourth charge pump; during a first phase the fourth charge pump supplies a DC voltage to a control electrode of the second transistor. The first capacitor is charged in the first phase by means of a coupling of the first electrode of the first capacitor to the first supply terminal via the first transistor, and by means of a coupling of the second electrode of the first capacitor to the second supply terminal via the output of the first inverter. The potential at the first electrode of the first capacitor reaches a value which is substantially equal to the potential at the first supply terminal because in the first phase the potential at the control electrode of the first transistor is approximately twice as high as the potential at the first supply terminal, so that the first transistor also remains in the conducting state when the potential at the second electrode of the first transistor approaches the potential at the first supply terminal. In the second phase, the potential at the first electrode of the first capacitor is approximately twice as high as the potential at the first supply terminal owing to a coupling of the second electrode of the first capacitor to the first supply terminal via the output of the first inverter. The first transistor is non-conducting in the second phase. The rectifier diode transfers a quantity of charge from the first capacitor to a load which is coupled to the output terminal. The potential at the first electrode of the first capacitor drops as a result of this, so that a voltage ripple arises at the first electrode of the first capacitor. Since the voltage difference across the rectifier diode is constant by first-order approximation, the voltage ripple at the first electrode of the first capacitor causes a voltage ripple at the output terminal.

It is a disadvantage of the known voltage converter that a smoothing capacitor with a comparatively high capacitance value must be coupled to the output terminal for obtaining an output voltage with a low ripple value.

SUMMARY OF THE INVENTION

It is an object of the invention to provide a voltage converter which generates a lower voltage ripple so that no capacitor with a comparatively high capacitance value need be coupled to the output terminal.

According to the invention, the voltage converter is for this purpose characterized in that the first unidirectional element comprises a first output transistor with a control electrode which is coupled to the first electrode of the second capacitor, a first main electrode coupled to the first electrode of the first capacitor, and a second main electrode coupled to the output terminal.

The invention is based on the recognition that the voltage ripple at the output terminal can be reduced in that the rectifier diode is replaced by an output transistor which fulfills the function of the rectifier diode as well as the function of a voltage stabilizer. The voltage ripple which arises at the first electrode of the first capacitor causes no voltage ripple at the output terminal because the value of the output voltage at the output terminal is determined by the potential at the control electrode of the output transistor minus the voltage difference between the control electrode and the second main electrode.

During the second phase, the voltage difference between the control electrode and the second main electrode of the first output transistor is constant by first-order approximation. The potential at the control electrode is also constant during the second phase. If the capacitance value of the first capacitor is sufficiently high, the potential at the first main electrode of the output transistor will always be higher than the potential at the second main electrode of the output transistor during the second phase. The output transistor acts as a voltage stabilizer during the second phase which prevents the voltage ripple at the first electrode of the first capacitor from being passed on to the output terminal.

The first output transistor is not conducting during the first phase, so that no charge is transferred to the output terminal. A voltage ripple can indeed arise during the first phase owing to a load which may be coupled to the output terminal. To prevent a voltage ripple at the output terminal also during the first phase, the voltage converter may in addition comprise a third charge pump comprising a third capacitor with a first and a second electrode, third means for alternately coupling, in counterphase to the first means, either the first electrode of the third capacitor to the first supply terminal and the second electrode of the third capacitor to the second supply terminal, or the second electrode of the third capacitor to the first supply terminal; a fourth charge pump comprising a fourth capacitor with a first electrode and a second electrode, fourth means for alternately coupling, in counterphase to the second means, either the first electrode of the fourth capacitor to the first supply terminal and the second electrode of the fourth capacitor to the second supply terminal, or the second electrode of the fourth capacitor to the first supply terminal; and a second output transistor with a control electrode which is coupled to the first electrode of the fourth capacitor, a first main electrode coupled to the first electrode of the third capacitor, and a second main electrode coupled to the output terminal. The second output transistor is conducting during the first phase and transfers a quantity of charge from the third capacitor to the output terminal. The second output transistor acts as a voltage stabilizer during the first phase, preventing the voltage ripple at the first electrode of the third capacitor from being passed on to the output terminal. Substantially no voltage ripple is present at the output terminal as a result of this.

An embodiment of the voltage converter according to the invention may be characterized in that the voltage converter comprises a first input terminal which is coupled to the second electrode of the first capacitor and to the second electrode of the second capacitor, a second input terminal which is coupled to the second electrode of the third capacitor and to the second electrode of the fourth capacitor, a first transistor with a first main electrode coupled to the first supply terminal, a second main electrode coupled to the first electrode of the the first capacitor, and a control electrode coupled to the first electrode of the fourth capacitor, a second transitor with a first main electrode coupled to the first supply terminal, a second main electrode coupled to the first electrode of the second capacitor and a control electrode coupled to the first electrode of the fourth capacitor, a third transistor with a first main electrode coupled to the first supply terminal, a second main electrode coupled to the first electrode of the third capacitor, and a control electrode coupled to the first electrode of the second capacitor, a fourth transistor with a first main electrode coupled to the first supply terminal, a second main electrode coupled to the first electrode of the fourth capacitor, and a control electrode coupled to the first electrode of the second capacitor, a first switching element with a first electrode which is coupled to the first supply terminal, a second electrode which is coupled to the second supply terminal, and a third electrode which is coupled to the first input terminal for alternately coupling either the first input terminal to the second supply terminal or the first input terminal to the first supply terminal; and a second switching element with a first electrode which is coupled to the first supply terminal, a second electrode which is coupled to the second supply terminal, and a third electrode which is coupled to the second input terminal for alternately coupling, in counterphase to the first switching element, either the second input terminal to the second supply terminal or the second input terminal to the first supply terminal.

The first means comprise the first switching element and the first transistor; the second means comprise the first switching element and the second transistor; the third means comprise the second switching element and the third transistor; and the fourth means comprise the second switching element and the fourth transistor. The first and the second capacitor are charged in the first phase in that the first and the second capacitor are connected between the first and the second supply terminal by means of the first transistor and the first switching element, and by means of the second transistor and the first switching element, respectively; the second electrodes of the third and the fourth capacitor are coupled to the first supply terminal by means of the third transistor and the second switching element and by means of the fourth transistor and the second switching element, respectively. Since the third and the fourth capacitor were charged in a preceding second phase, the potentials at the first electrodes of the third and the fourth capacitor are approximately equal to twice the potential at the first supply terminal immediately after the start of the first phase. The potential at the first electrode of the fourth capacitor will not drop substantially during the second phase. The potential at the first electrode of the third capacitor will drop during the second phase because a quantity of charge is transferred from the third capacitor through the output transistor to the output terminal.

The voltage converter is built up from two fully identical parts which operate in counterphase. The first transistor, second transistor, first output transistor, first capacitor, second capacitor, and first switching element are equivalent to the third transistor, fourth transistor, second output transistor, third capacitor, fourth capacitor, and the second switching element, respectively. A quantity of charge will thus be transferred from the first capacitor through the first output transistor to the output terminal during the first phase.

BRIEF DESCRIPTION OF THE DRAWINGS

The invention will be explained in more detail with reference to the accompanying drawing, in which.

The same components or elements have been given the same reference symbols in these Figures.

DESCRIPTION OF THE PREFERRED EMBODIMENT

Figure 1:
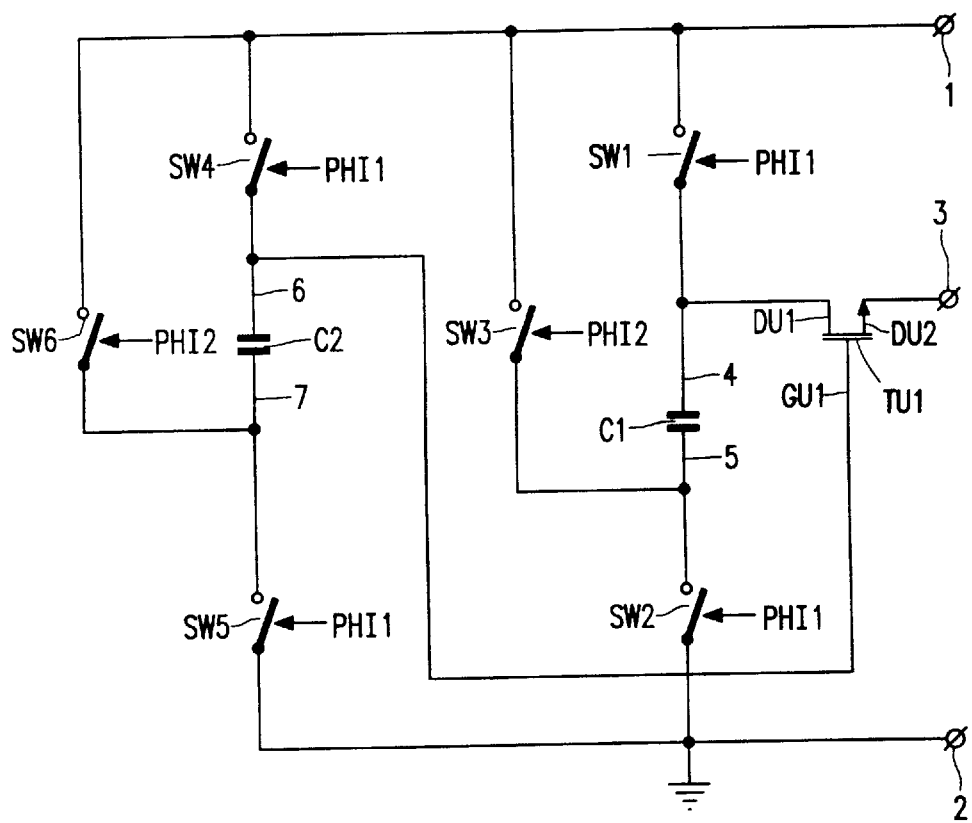
FIG. 1 is a circuit diagram showing the principle of a voltage converter according to the invention.

FIG. 1 is a circuit diagram representing the principle of a voltage converter according to the invention. The voltage converter comprises a first supply terminal 1, a second supply terminal 2, an output terminal 3, a first charts pump comprising a first capacitor C1 and a first and a second electrode 4, 5, first means constructed with a first, second, and third switch SW1, SW2, SW3 for alternately coupling either the first electrode 4 of the first capacitor C1 to the first supply terminal 1 and the second electrode 5 of the first capacitor C1 to the second supply terminal 2, or the second electrode 5 of the first capacitor C1 to the first supply terminal 1; a second charge pump comprising a second capacitor C2 with a first electrode 6 and a second electrode 7, second means constructed with a fourth, fifth, and sixth switch SW4, SW5, SW6 for alternately coupling, in counterphase to the first means, either the first electrode 6 of the second capacitor C2 to the first supply terminal 1 and the second electrode 7 of the second capacitor C2 to the second supply terminal 2, or the second electrode 7 of the second capacitor C2 to the first supply terminal 1, and a first output transistor TU1 with a control electrode GU1 which is coupled to the first electrode 6 of the second capacitor C2, a first main electrode DU1 coupled to the first electrode 4 of the first capacitor C1, and a second main electrode DU2 coupled to the output terminal 3. The first, second, fourth, and fifth switches SW1, SW2, SW4, SW5 are closed during a first phase PHI1 and open during a second phase PHI2. The third and sixth switches SW3, SW6 are closed during the second phase PHI2 and open during the first phase PHI1. The first and the second phase PHI1, PHI2 alternate continually in time. The first and the second capacitor C1, C2 are charged during the first phase PHI1, so that the voltage differences between the first and the second electrodes 4, 6; 5, 7; of the first and the second capacitor C1, C2 respectively, become equal to the voltage difference between the first and the second supply terminal 1, 2. The potential at the control electrode GU1 and the first main electrode DU1 is equal to the potential at the first supply terminal during the first phase PHI1; the potential at the second main electrode DU2 is higher than the potential at the first main electrode DU1. As a result, the first output transistor TU1 is not conducting, so that no charge can flow from the output terminal 3 to the first capacitor C1. During the second phase PHI2, the potentials at the second electrodes 5, 7 of the first and the second capacitor C1, C2 are equal to the potential at the first supply terminal 1. The potentials at the first electrodes 4, 6 of the first and the second capacitor C1, C2 are accordingly twice as high as the potential at the first supply terminal 1. The potentials at the first main electrode DU1 and the first control electrode GU1 are higher than the potential at the second main electrode DU2. As a result, the first output transistor TU1 is conducting and transfers a quantity of charge from the first capacitor C1 to the output terminal 3. The potential at the first electrode 4 of the first capacitor C1 will drop during this. Provided the capacitance value of the first capacitor C1 is sufficiently high, the potential at the first electrode 4 of the first capacitor C1 will always remain higher than than the potential at the output terminal 3. The control electrode of the first output transistor TU1 has a constant potential during the second phase PHI2. Since the potential difference between the control electrode GU1 and the second main electrode DU2 is independent of the current flowing through the first output transistor TU1 by a first-order approximation, the potential at the output terminal 3 will also be independent of the potential at the first electrode 4 of the first capacitor C1 by a first-order approximation. The first output transistor TU1 thus acts as a voltage stabilizer during the second phase.

Figure 2:
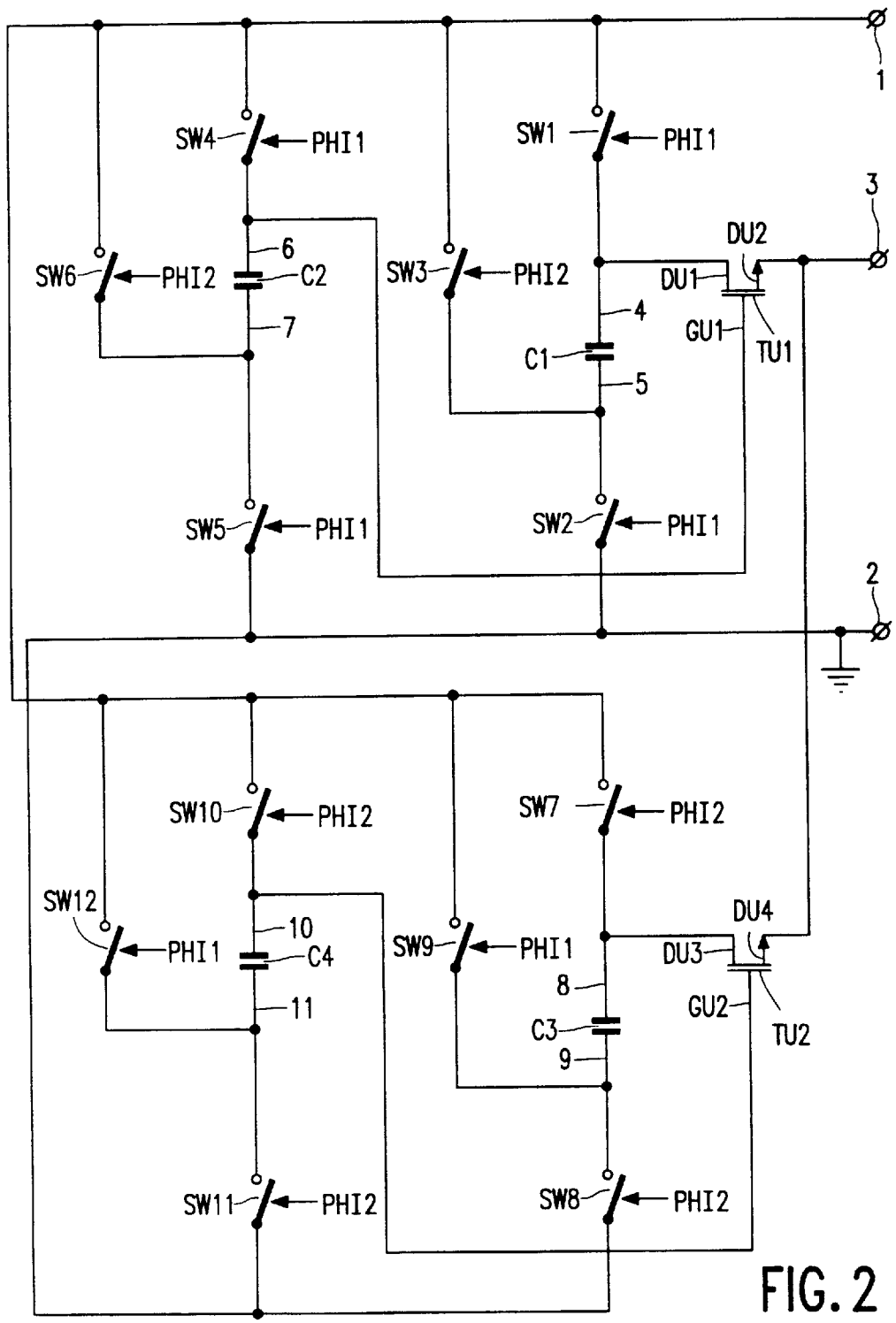
FIG. 2 is a circuit diagram showing the principle of an embodiment of a voltage converter according to the invention.

FIG. 2 is a circuit diagram showing the operating principle of an embodiment of a voltage converter according to the invention. The voltage converter is built up from two identical parts whose corresponding connection points are coupled to the first supply terminal 1, the second supply terminal 2, and the output terminal 3, respectively. The two identical parts are voltage converters according to the diagram of FIG. 1. The first switch SW1, the second switch SW2, the third switch SW3, the fourth switch SW4, the fifth switch SW5, the sixth switch SW6, the first capacitor C1, the second capacitor C2, and the first output transistor TU1 correspond to the seventh switch SW7, the eighth switch SW8, the ninth switch SW9, the tenth switch SW10, the eleventh switch SW11, the twelfth switch SW12, the third capacitor C3, the fourth capacitor C4, and the second output transistor TU2, respectively. The first to sixth switches SW1–SW6 operate in counterphase to the seventh to twelfth switches SW7–SW12. The first and the second capacitor C1, C2 are charged, the first output transistor TU1 is non-conducting, and the second output transistor TU2 transfers a quantity of charge from the third capacitor C3 to the output terminal 3 during the first phase PHI1. During the second phase PHI2, the third and the fourth capacitor C3, C4 are charged, the second output transistor TU2 is non-conducting, and the first output transistor TU1 transfers a quantity of charge from the first capacitor C1 to the output terminal 3. The effective voltage ripple at the output terminal 3 is reduced thereby.

Figure 3:
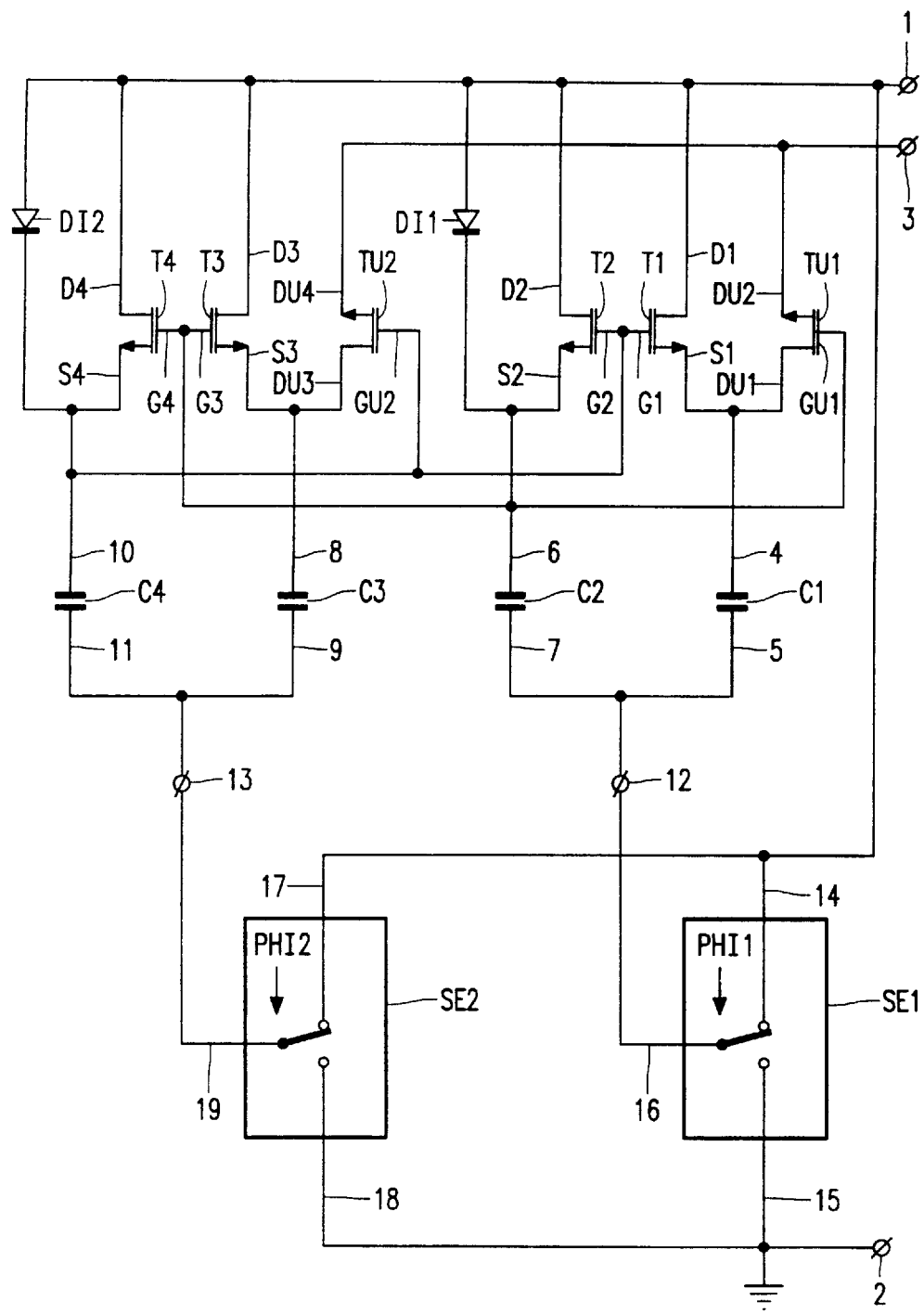
FIG. 3 is a circuit diagram of an embodiment of a voltage converter according to the invention.

The circuit diagram of FIG. 3 shows an implementation of the voltage converter according to the invention, following the principle of FIG. 2. In this implementation, the second electrodes 5, 7 of the first ant the second capacitor C1, C2 are coupled to a first input terminal 12. The second electrodes 9, 11 of the third and the fourth capacitor C3, C4 are coupled to a second input terminal 13. The voltage converter further comprises a first starting diode DI1 which is coupled between the first supply terminal 1 and the first electrode 6 of the second capacitor C2, and a second starting diode DI2 which is coupled between the first supply terminal 1 and the first electrode 10 of the fourth capacitor C4. The first transistor T1, the second transistor T2, the third transistor T3, and the fourth transistor T4 replace the first switch SW1, the fourth switch SW4, the seventh switch SW7, and the tenth switch SW10, respectively. A first switching, element SE1 replaces the second switch SW2, the third switch SW3, the fifth switch SW5, and the sixth switch SW6. A second switching element SE2 replaces the eighth switch SW8, the ninth switch SW9, the eleventh switch SW11, and the twelfth switch SW12. immediately after a voltage difference has been applied between the first and the second supply terminal 1, 2, the first and the second starting diode DI1, DI2 are conducting so that the second and the fourth capacitor C2, C4 are charged until the potentials at the first electrodes 6, 10 of the second and the fourth capacitor C2, C4 are so high that the respective first and second diodes DI1, DI2 become non-conducting again. The first and the second switching element SE1, SE2 may be constructed, for example, with a pulse generator having two outputs which are coupled to the first and to the second input terminal 12, 13, respectively. The two outputs of the pulse generator provide consecutive high levels and low levels which are in counterphase with one another. The high levels and the low levels are equal to the potentials at the first and at the second supply terminal, respectively.

The first, second, third, and fourth transistor T1, T2, T3, T4 as well as the first and second output transistors TU1, TU2 may be constructed as field effect transistors or as bipolar transistors. Instead of the conductivity type indicated, transistors of an opposite conductivity type may alternatively be used. The polarities of the potentials of the voltage converter then become the opposites. A combination of bipolar transistors and field effect transistors is also possible, for example field effect transistors for the first, second, third, and fourth transistors T1, T2, T3, T4, and bipolar transistors for the first and second output transistors TU1, TU2. The voltage converter may be constructed both in an integrated circuit and by means of discrete components.

I claim:

1. A voltage converter comprising a first supply terminal (1), a second supply terminal (2), an output terminal (3); a first charge pump comprising a first capacitor (C1) with a first (4) and a second electrode (5), first means for alternately coupling either the first electrode (4) of the first capacitor (C1) to the first supply terminal (1) and the second electrode (5) of the first capacitor (C1) to the second supply terminal (2), or the second electrode (5) of the first capacitor (C1) to the first supply terminal (1); a second charge pump comprising a second capacitor (C2) with a first electrode (6) and a second electrode (7), second means for alternately coupling, in phase with the first means, of either the first electrode (6) of the second capacitor (C2) to the first supply terminal (1) and the second electrode (7) of the second capacitor (C2) to the second supply terminal (2), or the second electrode (7) of the second capacitor (C2) to the first supply terminal (1); and a first unidirectional element coupled between the first electrode (4) of the first capacitor (C1) and the output terminal (3), characterized in that the first unidirectional element comprises a first output transistor (TU1) with a control electrode (GU1) which is coupled to the first electrode (6) of the second capacitor (C2), a first main electrode (DU1) coupled to the first electrode (4) of the first capacitor (C1), and a second main electrode (DU1) coupled to the output terminal (3).

2. A voltage converter as claimed in claim 1, characterized in that the voltage converter in addition comprises a third charge pump comprising a third capacitor (C3) with a first (8) and a second electrode (9), third means for alternately coupling, in counterphase to the first means, either the first electrode (8) of the third capacitor (C3) to the first supply terminal (1) and the second electrode (9) of the third capacitor (C3) to the second supply terminal (2), or the second electrode (9) of the third capacitor (C3) to the first supply terminal (1); a fourth charge pump comprising a fourth capacitor (C4) with a first electrode (10) and a second electrode (11), fourth means for alternately coupling, in counterphase to the second means, either the first electrode (10) of the fourth capacitor (C4) to the first supply terminal (1) and the second electrode (11) of the fourth capacitor (C4) to the second supply terminal (2), or the second electrode (11) of the fourth capacitor (C4) to the first supply terminal (1); and a second output transistor (TU2) with a control electrode (GU2) which is coupled to the first electrode (10) of the fourth capacitor (C4), a first main electrode (DU3) coupled to the first electrode (8) of the third capacitor (C3), and a second main electrode (DU4) coupled to the output terminal (3).

3. A voltage converter as claimed in claim 2, characterized in that the voltage converter comprises a first input terminal (12) which is coupled to the second electrode (5) of the first capacitor (C1) and to the second electrode (7) of the second capacitor (C2), a second input terminal (13) which is coupled to the second electrode (9) of the third capacitor (C3) and to the second electrode (11) of the fourth capacitor (C4), a first transistor (T1) with a first main electrode (D1) coupled to the first supply terminal (1), a second main electrode (S1) coupled to the first electrode (4) of the first capacitor (C1), and a control electrode (G1) coupled to the first electrode (10) of the fourth capacitor (C4), a second transistor (T2) with a first main electrode (D2) coupled to the first supply terminal (1), a second main electrode (S2) coupled to the first electrode (6) of the second capacitor (C2), and a control electrode (G2) coupled to the first electrode (10) of the fourth capacitor (C4), a third transistor (T3) with a first main electrode (D3) coupled to the first supply terminal (1), a second main electrode (S3) coupled to the first electrode (8) of the third capacitor (C3), and a control electrode (G3) coupled to the first electrode (6) of the second capacitor (C2), a fourth transistor (T4) with a first main electrode (D4) coupled to the first supply terminal (1), a second main electrode (S4) coupled to the first electrode (10) of the fourth capacitor (C4), and a control electrode (G4) coupled to the first electrode (6) of the second capacitor (C2); a first switching element (SE1) with a first electrode (14) which is coupled to the first supply terminal (1), a second electrode (15) which is coupled to the second supply terminal (2), and a third electrode (16) which is coupled to the first input terminal (12) for alternately coupling either the first input terminal (12) to the second supply terminal (2) or the first input terminal (12) to the first supply terminal (1); and a second switching element (SE2) with a first electrode (17) which is coupled to the first supply terminal (1), a second electrode (18) which is coupled to the second supply terminal (2), and a third electrode (19) which is coupled to the second input terminal (13) for alternately coupling, in counterphase to the first switching element (SE1), either the second input terminal (13) to the second supply terminal (2) or the second input terminal (13) to the first supply terminal (1).

4. A voltage converter as claimed in claim 1, characterized in that the voltage converter further comprises a first starting diode (DI1) for initial starting of the voltage converter, coupled between the first supply terminal (1) and the first electrode (6) of the second capacitor (C2).

5. A voltage converter as claimed in claim 2, characterized in that the voltage converter further comprises a first starting diode (DI1) and a second starting diode (DI2) which are coupled between the first supply terminal (1) and the first electrode (6) of the second capacitor (C2) and between the first supply terminal (1) and the first electrode (10) of the fourth capacitor (C4), respectively, for initial starting of the voltage converter.

6. A voltage converter as claimed in claim 4, characterized in that at least one of the starting diodes (DI1, DI2) is constructed by means of a transistor connected as a diode.

7. A voltage converter as claimed in claim 1, characterized in that at least one of the capacitors (C1, C2, C3, C4) is constructed by means of a field effect transistor connected as a capacitor.

8. A voltage converter as claimed in claim 2, characterized in that the voltage converter further comprises a first starting diode (DI1) for initial starting of the voltage converter, coupled between the first supply terminal (1) and the first electrode (6) of the second capacitor (C2).

9. A voltage converter as claimed in claim 3, characterized in that the voltage converter further comprises a first starting diode (DI1) for initial starting of the voltage converter, coupled between the first supply terminal (1) and the first electrode (6) of the second capacitor (C2).

10. A voltage converter as claimed in claim 3, characterized in that the voltage converter further comprises a first starting diode (DI1) and a second starting diode (DI2) which are coupled between the first supply terminal (1) and the first electrode (6) of the second capacitor (C2) and between the first supply terminal (1) and the first electrode (10) of the fourth capacitor (C4), respectively, for initial starting of the voltage converter.

11. A voltage converter as claimed in claim 5, characterized in that at least one of the starting diodes (DI1, DI2) is constructed by means of a transistor connected as a diode.

12. A voltage converter as claimed in claim 8, characterized in that at least one of the starting diodes (DI1, DI2) is constructed by means of a transistor connected as a diode.

13. A voltage converter as claimed in claim 9, characterized in that at least one of the starting diodes (DI1, DI2) is constructed by means of a transistor connected as a diode.

14. A voltage converter as claimed in claim 10, characterized in that at least one of the starting diodes (DI1, DI2) is constructed by means of a transistor connected as a diode.

15. A voltage converter as claimed in claim 2, characterized in that at least one of the capacitors (C1, C2, C3, C4) is constructed by means of a field effect transistor connected as a capacitor.

16. A voltage converter as claimed in claim 3, characterized in that at least one of the capacitors (C1, C2, C3, C4) is constructed by means of a field effect transistor connected as a capacitor.

17. A voltage converter as claimed in claim 4, characterized in that at least one of the capacitors (C1, C2, C3, C4) is constructed by means of a field effect transistor connected as a capacitor.

18. A voltage converter as claimed in claim 5, characterized in that at least one of the capacitors (C1, C2, C3, C4) is constructed by means of a field effect transistor connected as a capacitor.

19. A voltage converter as claimed in claim 6, characterized in that at least one of the capacitors (C1, C2, C3, C4) is constructed by means of a field effect transistor connected as a capacitor.

20. A voltage converter as claimed in claim 14, characterized in that at least one of the capacitors (C1, C2, C3, C4) is constructed by means of a field effect transistor connected as a capacitor.

* * * * *